UNITED STATES PATENT OFFICE.

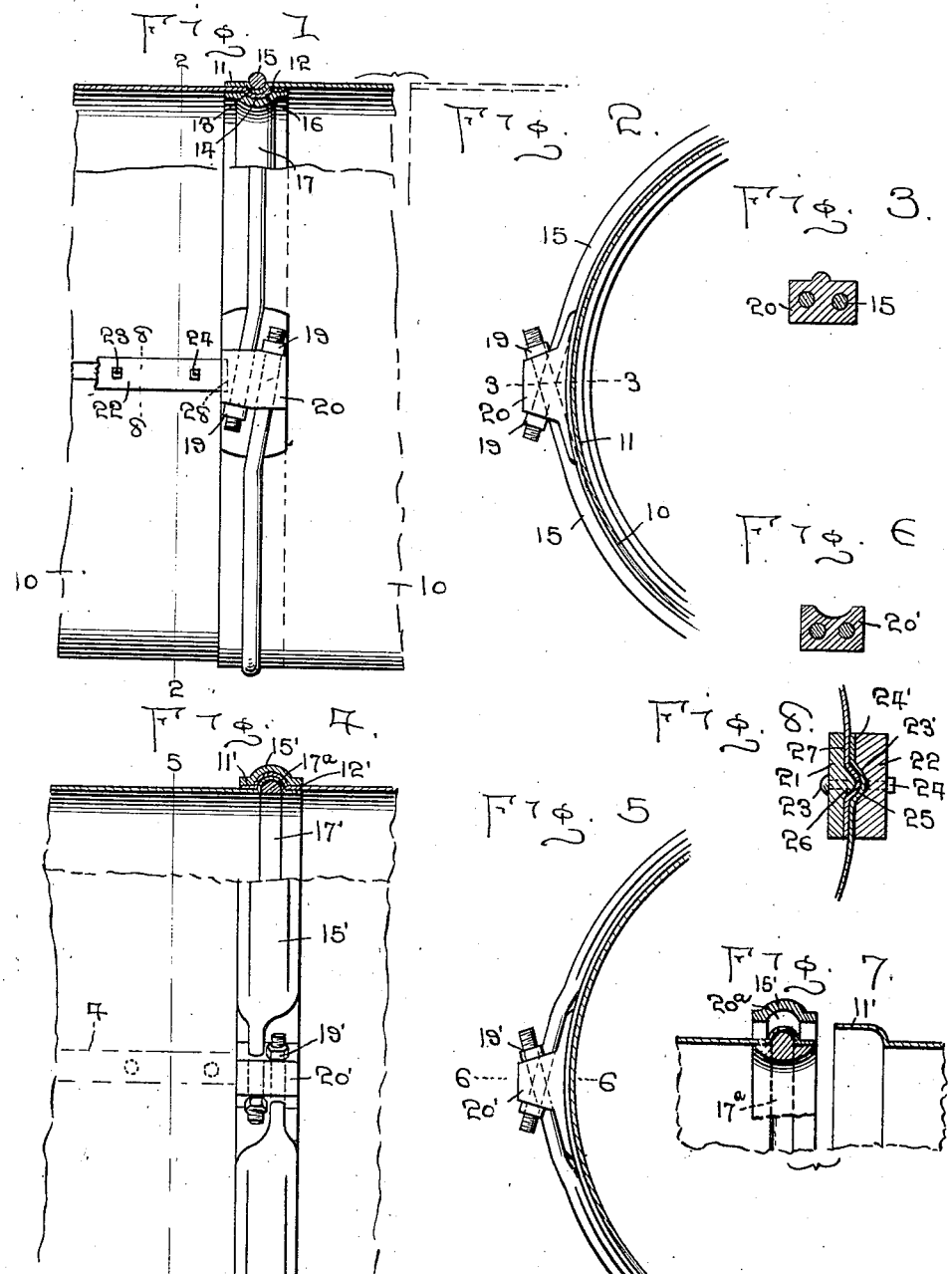

JOSEPH W. WELCH, OF OGDEN, UTAH.

PIPE CONSTRUCTION.

1,052,112.  Specification of Letters Patent.  Patented Feb. 4, 1913.

Application filed April 19, 1912. Serial No. 691,921.

*To all whom it may concern:*

Be it known that I, JOSEPH W. WELCH, citizen of the United States, residing at Ogden, in the county of Weber and State of Utah, have invented certain new and useful Improvements in Pipe Construction; and I do hereby declare the following to be a full, clear, and exact description of the invention, such as will enable others skilled in the art to which it appertains to make and use the same.

This invention relates to pipe construction, and it more particularly relates to knock-down pipe and to improved means for connecting the joints thereof.

The primary object of the invention is to provide for constructing comparatively large pipe sections in such shape that each said pipe section is interchangeable with the other similar pipe sections.

A further object of the invention is to provide a number of interchangeable pipe sections in a semi-finished condition, and to provide clamping means associated therewith and adapted to operate as a tool for finishing the pipe sections and for clamping them together.

A further object of the invention is to provide a number of similar cylindrical pipe sections which may be nested together, for the sake of compactness and convenience in handling, and thereby reducing the shipping or transporting expenses thereof.

Another object of the invention is to provide an improved pipe, composed of pipe sections joined together in such relation that the strength of said pipe is greater at the joints than elsewhere.

Other objects and advantages may be recited hereinafter and in the claim

In the accompanying drawings which form a part of this application, Figure 1 is a fragmental sectional view of two adjacent end portions of a pair of pipe sections united in accordance with one embodiment of my invention. Fig. 2 is a transverse sectional view on the line 2—2 of Fig. 1. Fig. 3 is a sectional view on the line 3—3 of Fig. 2. Fig. 4 is a view similar to Fig. 1, showing a modified form of my invention. Fig. 5 is a view similar to Fig. 2 taken on the line 5—5 of Fig. 4. Fig. 6 is a sectional view on the line 6—6 of Fig. 5. Fig. 7 is a modified detail view, illustrating the manner of uniting the pipe sections, similar to the construction shown in Figs. 4 and 5, and, Fig. 8 is an enlarged sectional view on the line 8—8 of Fig. 1.

In these drawings, in which similar reference characters designate corresponding parts throughout the several views, two similar pipe sections 10, are provided with lapped ends 11 and 12 respectively, as shown in Fig. 1; and, for the sake of clearness, the end 11 will hereinafter be known as the overlapping end, while the end 12 will be known as the inserted end. Each of these pipe sections is provided with a peripheral groove 13 and 14 respectively. A binding or clamping wire or ring 15 is fitted into the groove 13, while a bead 16, formed on the inner surface of the overlapping end 11, fits into the groove 14. An annular brace ring 17, has its outer surface provided with a groove, into which the bead 16, of the inserted end of the pipe section, is fitted.

The ring 15 consists of a length of wire having its ends threaded and having nuts 19 fitted thereon, the adjacent end portions of the ring extending through an apertured tightener head 20, the elongated apertures of which pass each other at an angle, as shown in Fig. 2. The inner surface is concaved in the circumferential direction of the pipe sections, and convexed in the longitudinal or axial direction thereof, so that the concaved portion conforms to the outer surface of the overlapping end 11, while the convexed portion conforms to the groove 13.

The meeting edges of each pipe section are preferably united by means of clamping strips 21 and 22, bolts 23 and nuts 24, as more clearly illustrated in Fig. 8. In this construction, the adjacent edge portions are grooved, beaded and fitted together at 25, between the members 21 and 22, the outer clamping strip 22 being provided with a groove 23', for receiving the bead on the overlapping edge 24', while the inner clamping strip 21 is provided with a bead 26, fitted into the groove of the inner edge portion 27. The grooved and beaded end portions of the lapped edges are apertured for the reception of the bolts 23, the clamping strips 21 and 22 having apertures registering with the apertures of the lapping edge portions, for receiving said bolts, whereby, in coöperation with the nuts 24, the edge portions 24' and 27 are firmly clamped together.

I may assemble the pipe sections in such relation that the adjacent edge portions and clamping strips are diametrically opposite to the tightener heads, as indicated in dotted lines, in Fig. 4, or I may assemble them with the clamping members and tightener heads contiguous, as shown in Fig. 1. I may also provide the tightener heads with apertured side surfaces for the reception of the end of the clamping strip 22, as indicated at 28, Fig. 1.

In practice, the pipe sections are adapted to be nested together for shipment, storage, etc., the clamping strips being tied in bundles, the brace rings 17 being separately nested and tied together, the rings 15 being tied in bundles, and the tightener heads being packed in boxes; and thus the separate elements of the pipe may be easily transported to the place where they are to be installed, and thus accomplish a great saving in transportation charges, as is obvious.

It may be desirable, under certain conditions, to use other means than that described and illustrated in Figs. 1 and 8 for connecting the edges of the pipe sections, and such means may consist of permanent connections, of any proper character, not shown; therefore, the pipe sections would not be nested together, but would be shipped separately as cylindrical pipe elements. When thus constructed, the inserted ends 12 would be engaged with the brace rings 17, as shown in Fig. 1; but the outer or overlapping end member 11 would be rectilinear, as shown in dotted lines, Fig. 1; that is, no bead or groove would be provided until the pipe sections were assembled, whereupon the overlapping end 11 would be placed in position over the inserted end 12, the ring 15 and tightener head 20 adjusted thereon, and the nuts 19 tightened, thereby tightening the ring 15 and the convexed portion of the tightener head against the outer surface of the overlapping end 11 and forcing the contiguous surface of the overlapping end portion into the groove of the inserted end portion.

In the modified form shown in Fig. 4, the relation of the end connecting elements are the reverse of those shown in Figs. 1, 2 and 3; that is, in this modified construction, the brace ring 17' is provided with a bead 17ᵃ on its outer surface; said bead fitting into a corresponding groove in the inserted end 12', said inserted end having a corresponding bead fitted into the grooved end of the overlapping end 11', and the corresponding bead of said overlapping end being fitted into an internal annular groove in the tightening ring 15'. In this modified construction, the tightening ring 15' is provided with screw-threaded ends carrying tightening nuts 19'. The tightener head 20' is provided with a double concaved inner surface 20ᵃ, which conforms to the outer surface of the overlapping end portion 11'. When it is desired to assemble pipe sections of this character, having their edge portions fixedly united, the brace rings 17' are removably fitted into the corresponding grooves, as shown in Fig. 7, the overlapping end portions being enlarged and flanged, so as to receive the inserted end portion of the contiguous pipe section, and after the latter has been inserted, the tightening ring 15' is placed in position and the nuts 19 are then tightened, thereby forcing the tightening ring against the surface of the overlapping flange and causing it to conform to the bead on the inserted flange.

When the pipe sections are formed from comparatively heavy sheet metal, the clamping of the members 15 and 15', and the conforming of the respective grooves and beads thereof, may be assisted by hammering at different points around the tightening rings while the nuts 19 and 19' are being tightened.

It will be seen that I have provided a pipe construction which is fully capable of attaining the foregoing objects, and in a thoroughly practical and efficient manner.

I do not limit my invention to the exact details of construction, combination and arrangement of parts, as I have described and illustrated in the foregoing, but my invention may only be limited by a reasonable interpretation of the following claim.

What I claim is:

A knock-down pipe comprising pipe sections each formed from a sheet of metal curved into cylindrical form so that its opposite edge portions overlap, clamping strips having means associated therewith for securing the overlapping edges together, said pipe sections having grooved and beaded end portions adapted to be fitted together, so that the bead of one pipe section engages with the groove of the contiguous pipe section, clamping rings for securing the contiguous ends together, and a tightener head having means associated therewith by which the clamping ring may be actuated, said tightener head having an aperture for receiving an end of one of the clamping strips.

In testimony whereof I have signed my name to this specification in the presence of two subscribing witnesses.

JOSEPH W. WELCH.

Witnesses:
A. P. BIGELOW.
M. E. RAWSON.